United States Patent [19]

Murakami et al.

[11] Patent Number: 4,652,780

[45] Date of Patent: Mar. 24, 1987

[54] MAGNETIC BEARING DEVICE

[75] Inventors: Chikara Murakami; Atsushi Nakajima, both of Tokyo; Yoshiharu Shimamoto, Yokohama; Hiroshi Takahashi, Tokyo, all of Japan

[73] Assignee: Kabushiki Kaisha Toshiba, Kawasaki, Japan

[21] Appl. No.: 792,838

[22] Filed: Oct. 30, 1985

[30] Foreign Application Priority Data

Jan. 31, 1985 [JP] Japan .................................. 60-16837

[51] Int. Cl.$^4$ .............................................. F16C 39/06
[52] U.S. Cl. .................................................. 310/90.5
[58] Field of Search ...................... 308/10; 310/74, 153

[56] References Cited

U.S. PATENT DOCUMENTS

| | | | |
|---|---|---|---|
| 3,955,858 | 5/1976 | Poubeau | 308/10 |
| 4,000,929 | 1/1977 | Studer | 308/10 |
| 4,211,452 | 7/1980 | Poubeau | 308/10 |
| 4,470,644 | 9/1984 | Weisser | 308/10 |
| 4,483,570 | 11/1984 | Inoue | 308/10 |

FOREIGN PATENT DOCUMENTS

| | | | |
|---|---|---|---|
| 2842165 | 4/1980 | Fed. Rep. of Germany | 308/10 |
| 60-11746 | 1/1985 | Japan | 308/10 |
| 60-11716 | 1/1985 | Japan | 308/10 |
| 2033977 | 5/1980 | United Kingdom | 308/10 |

Primary Examiner—R. Skudy
Attorney, Agent, or Firm—Oblon, Fisher, Spivak, McClelland & Maier

[57] ABSTRACT

A flywheel assembly has a base and a flywheel rotatable with respect to and in contact free relation with the base. First and second annular yokes are secured to the base coaxial with the flywheel, and coupled to each other by radially extending control poles. Control coils are wound around the poles. An annular magnet is mounted on the first yoke, coaxial therewith, and a third annular yoke is mounted on the magnet. An outer cylindrical yoke is secured to the flywheel at the outside of the first yoke, and an inner cylindrical yoke is fixed to the flywheel at the inside of the second yoke. The cylindrical yokes are coupled to each other by an annular yoke. A magnetic flux from the magnet flows through the magnet, third yoke, outer cylindrical yoke, first yoke, and the magnet, thereby controlling the axial position of the flywheel. A control flux produced by one of the coils flows through a control magnetic path which passes through one of the poles, first yoke, outer cylindrical yoke, annular yoke, inner cylindrical yoke, second yoke and said one of the poles, and extends radially with respect to the rotational axis of the flywheel, thereby controlling the radial position of the flywheel.

14 Claims, 8 Drawing Figures

MAGNETIC BEARING DEVICE

BACKGROUND OF THE INVENTION

This invention relates to a magnetic bearing device suited for supporting a body rotating at a high speed, e.g., a flywheel assembly, by contact-free support.

A flywheel assembly which is used for attitude control of an artificial satellite should have an inspection-free, semi-permanent life. Therefore, the flywheel assembly is supported by a magnetic bearing, which can realize perfect contact-free support. A prior art magnetic bearing used to this end comprises a radial support portion and an axial support portion, the radial support portion being of a passive type using a permanent magnet, the axial support portion being of an active type using control coils.

However, where the radial support portion of the magnetic bearing of the type noted is of a passive type using a permanent magnet, it is necessary to dispose a permanent magnet and a yoke, as a support element, in the axial direction of the flywheel body as a rotor between the opposite ends of the flywheel body and stationary bases facing these ends, such that a magnetic gap is formed. Therefore, when the degree of stiffness $K\theta$ around the orthogonal axis of the flywheel assembly is increased, the angular motion of the rotary portion is sacrificed, and the length or axial dimension of the assembly is increased. The stiffness $K\theta$ around the orthogonal axis is given as $$K\theta = \tfrac{1}{4} Kr(B^2 - \tfrac{1}{2} \cdot Ku/Kr \cdot A^2)$$

where $Kr$ is the stiffness in the radial direction, $A$ is the diameter of the bearing section, $B$ is the axial length of the assembly, and $Ku$ is the axial out-of-balance stiffness.

As is seen from this equation, the greater the diameter $A$ of the bearing section the lower is the degree of stiffness $K\theta$. Hence, to increase the stiffness $K\theta$ the diameter $A$ of the bearing section must be made as small as possible. This means that the rotor side support elements constituting the radial support portion must be made as small as possible. Therefore, the rotor side support elements must be mounted in the neighborhood of the axis of the flywheel body, with the result that the mass of the rotor side support elements cannot be effectively used with respect to the angular motion of the flywheel body. This means that the angular motion per unit mass of the rotor section is inevitably small. Instead of increasing the diameter $A$ of the bearing section in order to increase the degree of stiffness $K\theta$, consideration may, in light of the above equation, be given to increasing the axial length $B$. Doing so, however, only serves to increase the axial length of the entire assembly, which is undesirable from the standpoint of mounting the assembly in the artificial satellite.

In order to overcome the above drawbacks, a magnetic bearing has been proposed, in which the portion supporting the flywheel in the axial direction is of a passive type using a permanent magnet, and the portion supporting the flywheel body in the radial direction is of an active type using control coils.

FIGS. 1 and 2 schematically show this type of bearing. As is shown, a flywheel body 12, which is a shallow bottomed cylinder, is disposed in contact-free relation to the outer periphery of a base 10 such that it is rotatable relative to the base 10. A large-diameter annular magnet 14 is secured to the inner periphery of the flywheel body 12 and magnetized in the axial direction. A small-diameter annular magnet 16 is secured to the outer edge of the body 10 such that it faces the large-diameter magnet 14 coaxially. The magnet 16 is magnetized axially and in the opposite direction to the magnet 14. Annular yokes 18a and 18b are secured to the opposite pole surfaces of the magnet 14. Likewise, annular yokes 18c and 18d are secured to the opposite pole surfaces of the magnet 16. The magnetic flux produced by the magnets 14 and 16 thus flows through the magnet 14, yoke 18a, yoke 18c, magnet 16, yoke 18d, yoke 18b, and back to the magnet 14, whereby an axially passive type support is realized. Four control poles 20a to 20c arranged in the form of a cross are fixed to the inner periphery of the yoke 18d; the base 10 being constituted by the yoke 18d and the control poles 20a to 20d. Control coils 22a to 22d are wound around the control poles 20a to 20d, respectively. The radial position of the flywheel body 12 is stabilized through appropriate excitation of these coils.

The degree of stiffness $K\theta$ and orthogonality of the axis of the above magnetic bearing, which, unlike the radially passive type magnetic bearing noted before, is of the axially passive type, is greater the larger the bearing diameter and the smaller the gap between the yokes 18a (or 18b) and 18c (or 18d). Thus, it is possible to reduce the length, i.e., axial dimension, of the bearing and provide a flat and large-diameter flywheel assembly having a high degree of magnetic stiffness $K\theta$.

When the control coils 22a and 22c of this magnetic bearing are energized as shown in FIG. 2, the control fluxes produced by these coils flow through the control poles 20a and 20c, and also through the annular yoke 18b in the circumferential direction thereof. When the fluxes flow through the yoke 18b in the circumferential direction, there is a danger that the yoke will soon be magnetically saturated because of the small sectional area of the magnetic path. That is, the flux that can pass through the yoke 18b is limited, so that it is impossible to sufficiently control the radial position of the flywheel body 12, particularly, when a dynamic disturbance is received. In addition, the magnetic path through which the control fluxes flow is of a considerable length and is open to the outside. Therefore, leakage of the control flux to the outside of the flywheel assembly is liable to result. Therefore, where electronic circuits or the like are provided on the outer side of the flywheel assembly, they are liable to be adversely affected.

Since the annular magnet 14 in this magnetic bearing is secured to the flywheel body 12 as the rotor, it should be secured firmly enough so that it can function sufficiently when the flywheel body 12 is rotated at a high speed. Further, the rotational balance of the flywheel body 12 must be adjusted by taking the circumferential direction imbalance of the mass of the magnet 14 into consideration.

Further, when there are fluctuations of the flux from the magnet 14 in the circumferential direction due to fluctuations in the shape and magnetic characteristics of the magnet 14, the radial forces of attraction between the flywheel body and base are varied with the rotation of the flywheel body. In this case, it is difficult to efficiently stabilize the flywheel body with the control coils 22a to 22d.

SUMMARY OF THE INVENTION

The present invention has been contrived in consideration of the above circumstances, and its object is to provide a magnetic bearing device which permits effective rotor position control without reducing the magnetic rigidity, and which is less subject to leakage of the flux.

To attain the above object of the invention, there is provided a magnetic bearing device, which comprises a stator; a rotor rotatable with respect to and in contact-free relation with the stator; an annular magnet secured to the stator, coaxial with the rotational axis of the rotor, and magnetized in the axial direction; magnetic path forming means including a stator side yoke secured to the stator and magnetically coupled to the annular magnet, at least three control poles magnetically coupled to the stator side yoke and radially extending with respect to the rotational axis of the rotor in a uniformly separated relationship to one another in the circumferential direction, and a rotor side yoke, secured to the rotor to face the stator side yoke, for forming a first magnetic path for the flow of a magnetic flux from the magnet through the stator side yoke and rotor side yoke to control the axial position of the rotor, and for forming a control magnetic path passing through the stator side yoke, rotor side yoke and one of the control poles, overlapping part of the first magnetic path, and extending substantially radially with respect to the axis of rotation of the rotor; control coils, individually wound around the control poles, for generating a control flux that flows through the control magnetic path to control the flux passing through the first magnetic path magnetic path; detecting means for detecting the relative radial positions of the rotor and stator; and control means for energizing the control coils, in accordance with the output of the detecting means, to control the radial position of the rotor with respect to the stator.

BRIEF DESCRIPTION OF THE DRAWINGS

FIGS. 1 and 2 illustrate a prior art magnetic bearing, in which FIG. 1 is a schematic longitudinal sectional view of the magnetic bearing, and FIG. 2 is a sectional view taken along line II—II in FIG. 1;

FIGS. 3 to 5 illustrate a magnetic bearing apparatus according to a first embodiment of the invention, in which FIG. 3 is a longitudinal sectional view, FIG. 4 is a sectional view taken along line IV—IV in FIG. 3, and FIG. 5 is a longitudinal sectional view showing the flow of magnetic fluxes;

FIGS. 7 and 8 illustrate a magnetic bearing apparatus according to a second embodiment of the invention, in which FIG. 7 is a sectional view similar to FIG. 3 and FIG. 8 is a longitudinal axial sectional view showing the flow of magnetic fluxes.

DETAILED DESCRIPTION OF THE PREFERRED EMBODIMENTS

Now, preferred embodiments of the invention will be described in detail with reference to the drawings.

Figure 1:
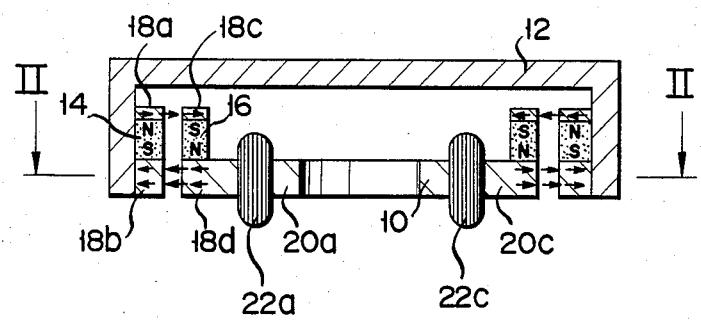
Figure 2:
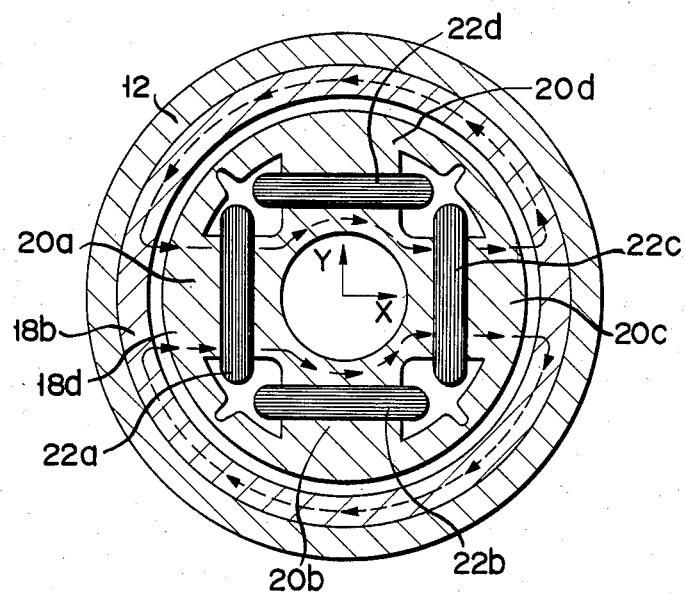
Figure 3:
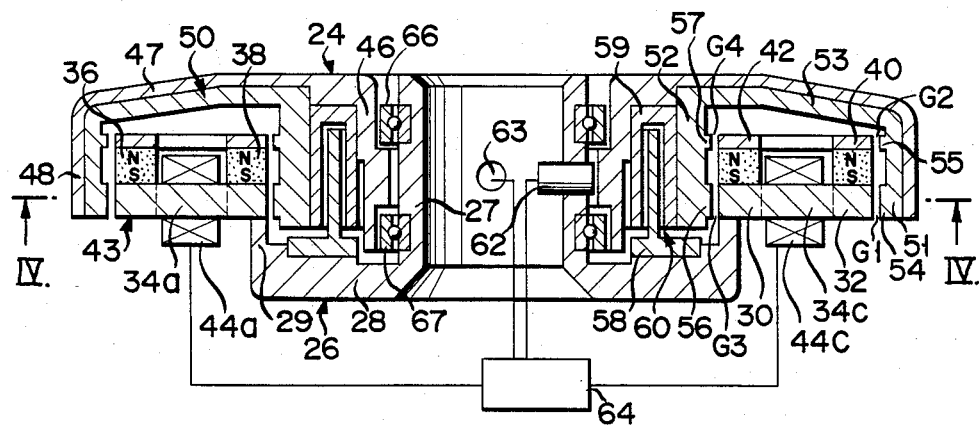

As shown in FIG. 3, the magnetic bearing device according to this embodiment includes a base 26 as a stator and a flywheel 24 as a rotor disposed in contact-free relation with and rotatable with respect to the base 26.

Figure 4:
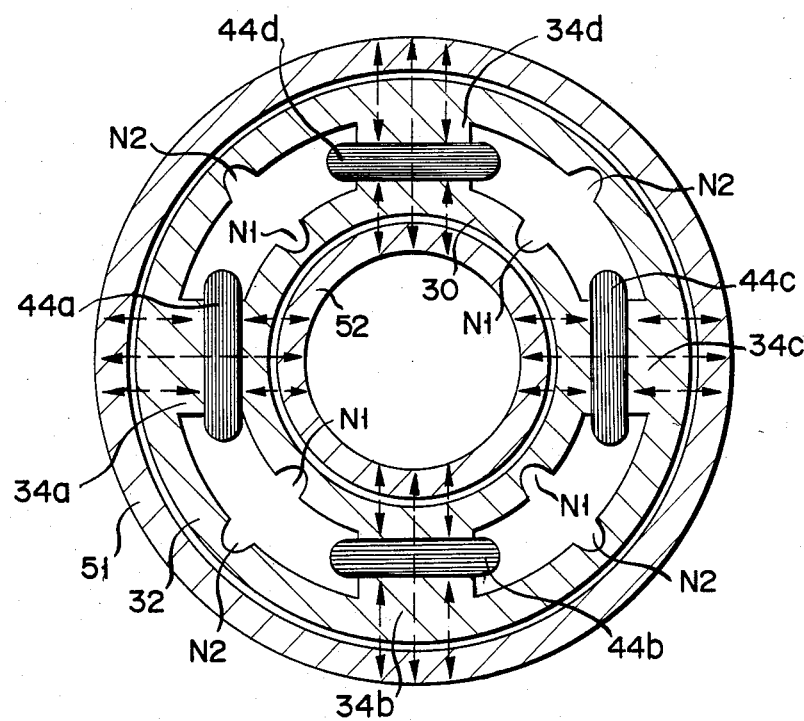

The base 26 has a cylindrical portion 27, a flange 28 integrally extending outward from an end (i.e., the lower end in the FIG. 3) of the cylindrical portion 27, and an outer end portion 29 extending slightly upward from the outer periphery of the flange 28. A second annular yoke 30 made of a magnetic material is secured to the top of the outer end portion 29, coaxial with the cylindrical portion 27. A large-diameter first annular yoke 32 is coaxially disposed on the outside of the yoke 30. As shown in FIG. 4, the yokes 30 and 32 are coupled together both electrically and mechanically by four flat control poles 34a to 34d of a magnetic material. The control poles 34a to 34d extend radially with respect to the axis of the base 26 are uniformly spaced in relation to one another. A first annular magnet 36 and a second annular magnet 38 are secured to the top of the respective yokes 32 and 30, coaxial with the cylindrical portion 27. The magnets 36 and 38 are magnetized in the same direction along the axial direction thereof. Third and fourth annular yokes 40 and 42 are secured to the top of the respective magnets 36 and 38. The yokes 30, 32, 40 and 42 constitute a stator side yoke 43 according to the invention.

Control coils 44a to 44d are wound around the respective control poles 34a to 34d. The outer periphery of the second yoke 30 and inner periphery of the first yoke 32 are formed with notches N1 and N2 at positions midway between two adjacent control poles 34a to 34d. These notches N1 and N2 have the effect of preventing control fluxes produced by the control coils (to be described later) from leaking circumferentially along the yokes 30 and 32 to adjacent control poles.

As shown in FIGS. 3 and 4, the flywheel 24, which is made of a non-magnetic material, has an inner cylindrical portion 46, a flange 47 radially extending outward from the top of the inner cylindrical portion 46, and an outer cylindrical portion 48 extending downward from the outer periphery of the flange 47 coaxial with the inner cylindrical portion. The inner cylindrical portion 46 is disposed around the circumference of the cylindrical portion 27 of the base in a coaxial and contact-free relation therewith. The outer cylindrical portion 48 is located on the outside of the first annular magnet 36 in a contact-free relation thereto. A rotor side yoke 50 made of a magnetic material is secured to the inner surface of the flywheel 24. The rotor side yoke 50 includes an outer cylindrical portion 51 coaxially facing the outer side of the first magnet 36, an inner cylindrical portion 52 coaxially facing the inner side of the second magnet 38, and an annular portion 53 magnetically and mechanically coupling the tops of the outer and inner cylindrical portions 51 and 52. The inner periphery of the outer cylindrical portion 51 has first and second annular projections 54 and 55 facing the first and third yokes 32 and 40, respectively, annular magnetic gaps G1 and G2 being thus defined between the ridges 54 and 55 and the yokes 32 and 40. The outer periphery of the inner cylindrical portion 52 has third and fourth annular projections 56 and 57 facing the second and fourth yokes 30 and 42, respectively, annular magnetic gaps G3 and G4 being thus defined between the ridges 56 and 57 and the yokes 30 and 42.

A ring-like stator 58 is secured to the top of the flange 28 of the base 26. A rotor 59 is secured to the flywheel 24 so that it co-operates with the rotor 58. The stator 58 and rotor 59 constitute a brushless motor 60 for rotating the flywheel 24. A pair of displacement sensors 62 and 63 are secured to the cylindrical portion 27 of the base 26. These sensors 62 and 63 project from the outer periphery of the cylindrical portion 27 to face the inner periphery of the inner cylindrical portion 26 of the flywheel 24. They are located on the center lines of the control poles 34c and 34d, respectively. They may, for instance, be of an eddy current type, and are connected to a stabilization controller 64. These displacement sensors supply outputs, representing the radial distance between the base 26 and flywheel 24, to the controller 64. Mechanical bearings 66 and 67 are provided for supporting the flywheel 24 in case of emergency. Their inner races are secured to the outer periphery of the cylindrical portion 27 of the base 26.

Input terminals of the control coils 44a to 44d are connected to the output terminals of the controller 64. The controller 64 adopts a well-known control system and excites the control coils 44a to 44d in accordance with the outputs of the displacement sensors 62 and 63, in the following way.

For example, when the gap length of the magnetic gap G1 is reduced at a certain position in the circumferential direction, the gap length in the diametrically opposite position is increased. This relation appears as changes in the outputs of the displacement sensors 62 and 63. More specifically, the stabilizaiton controller 64 energizes a control coil (i.e., one of the control coils 44a to 44d) nearest the place where the gap length is reduced, so as to reduce the flux passing through that portion of the magnetic gap, and it also energizes a control coil nearest the place where the gap length is increased, so as to increase the flux through that portion of the magnetic gap. The energization of these control coils is stopped when the gap length is balanced, i.e., when the gap length is uniform at all points in the circumferential direction. In this way, the flywheel 24 is controlled so that it is held stably at the proper radial position at all times.

The operation of the magnetic bearing apparatus having the above construction will now be described.

Figure 5:
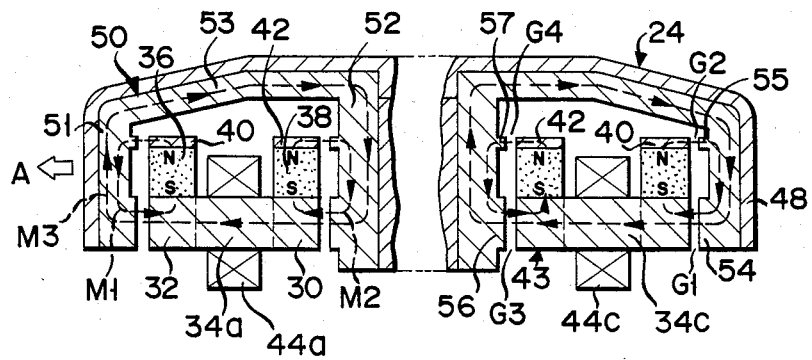

As shown in FIG. 5, the flux from the first annular magnet 36 flows along a first magnetic path M1 which passes through the magnet 36, third yoke 40, magnetic gap G2, projection 55, outer cylindrical portion 51, projection 54, magnetic gap G1, first yoke 32, and back to magnet 36. The flux from the second annular magnet 38 flows along a second magnetic path M2 which passes through the magnet 38, fourth yoke 42, magnetic gap G4, projection 57, inner cylindrical portion 52 projection 56, magnetic gap G3, second yoke 30, and back to magnet 38. These fluxes produce magnetic forces of attraction acting between the first yoke 32 and projection 54, between the third yoke 40 and projection 55, between the second yoke 30 and projection 56, and between the second yoke 42 and projection 57. When the magnetic forces of attraction are proper, they prevent axial movement of the flywheel 24. Thus, an axially passive type support is realized.

The flux for stabilizing the flywheel 24 in the radial direction thereof is produced as given ones of the control coils 44a to 44d are energized according to the outputs of the displacement sensors 63 and 63. For example, when the flywheel 24 is to be moved in the direction of arrow A in FIG. 5, the control coil 44a is energized to generate a control flux. This control flux flows along a third magnetic path M3 which passes through the control pole 34a, first yoke 32, magnetic gap G1, projection 54, outer cylindrical portion 51, annular portion 53, inner cylindrical portion 52, projection 56, magnetic gap G3, second yoke 30, and back to control pole 34a. This control flux has the effect of reducing the flux passing through the first magnetic path M1 and increasing the flux passing through the second magnetic path M2. That is, it has the effect of reducing the magnetic forces of attraction between the third yoke 40 and projection 55 and between the first yoke 32 and projection 54, and of increasing the magnetic forces of attraction between the fourth yoke 42 and projection 57 and between the second yoke 30 and projection 56. The control coil 44c, which is diametrically opposite the control coil 44a, is energized to generate control flux in the same sense as the flux generated by the control coil 44a; whereby the flywheel 24 is moved in the direction of arrow A. The flywheel 24 thus is controlled such that it is stably held at the proper radial position relative to the base 26. When the brushless motor 60 is energized, the flywheel 24 is rotated in an entirely contact-free relation to the base 26. The function of the magnetic bearing thus can be realized.

With the magnetic bearing device having the above construction, the control fluxes produced by energizing the control coils 44a to 44d flow through magnetic paths consisting of a closed loop extending radially with respect to the axis of rotation of the flywheel 24, as shown in FIGS. 4 and 5. Thus, unlike the prior art magnetic bearing where the control flux flows through the yoke in the circumferential direction, the magnetic path has a large sectional area to permit passage of a sufficient amount of control flux. The control of the radial position of the flywheel 24 thus can be efficiently achieved. In addition, the magnetic path of the control flux is shorter than that of the magnetic path in the prior art magnetic bearing; moreover the magnetic gaps are also covered by the magnetic material. Thus, it is possible to reduce leakage of flux to the outside to reduce adverse effects on the nearby apparatus. Further, it is possible to reduce the size and weight of the entire assembly. Where weight reduction is made only on the stationary body side, it is possible to improve the ratio of the angular motion to mass that is necessary for the flywheel assembly.

Further, the flywheel 24, as the rotor, is not provided with any annular magnet at all. Therefore, no mechanical strength and performance considerations are necessary even when the flywheel 24 is rotated at a high speed. The flywheel 24 and rotor side yoke 50 can be machined with high precision compared to the machining of the annular magnets 36 and 38 which are generally formed of sintered materials. It is thus possible to obtain a well-balanced rotor. Further, since the magnets 36 and 38 and control poles 34a to 34d are provided on the base as a stator, slight fluctuations of the flux density in the circumferential direction of the magnets 36 and 38 will appear in effect as an axial deviation of the flywheel when the flywheel is stationary. This deviation can be readily compensated for by the controller 64. Thus, the control fluxes generated by the control coils 44a to 44d need only to compensate the mechanical deviation of the flywheel from a balanced state, at the time of the rotation of the flywheel. Further, fluctuations of the flux density from the magnets with the rotation of the rotor will not have any adverse effect on the operation of the control coils.

The present invention is not limited to the above embodiment and can be modified variously within the scope of the invention.

Figure 6:
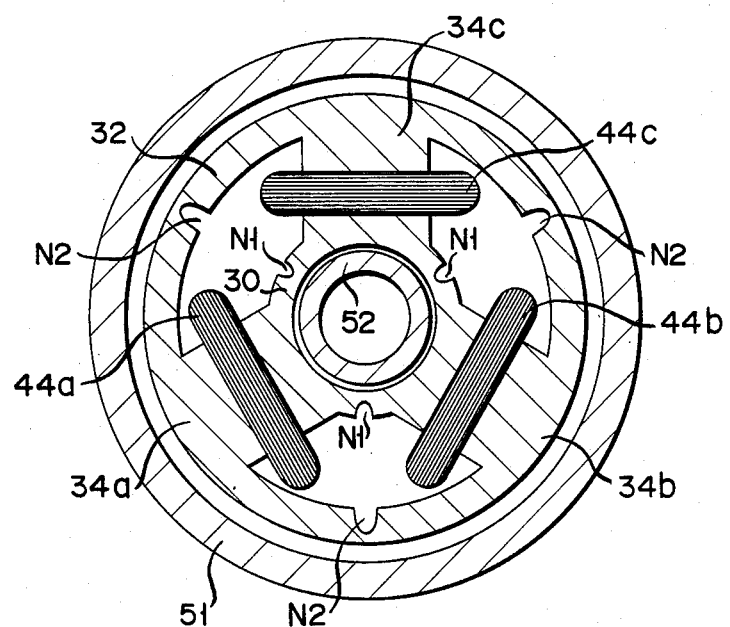
FIG. 6 is a sectional view showing a modification of the invention.

For example, while four control poles are provided in the above embodiment, it is also possible to provide three control poles 34a to 34c, as shown in FIG. 6. These control poles of course extend radially with respect to the axis of rotation of the flywheel, and are uniformly spaced apart along the circumferential direction.

Further, while the above first embodiment used the first and second annular magnets 36 and 38, a sufficient function of the magnetic bearing can be obtained even when only either one of these two magnets is provided.

Figure 7:
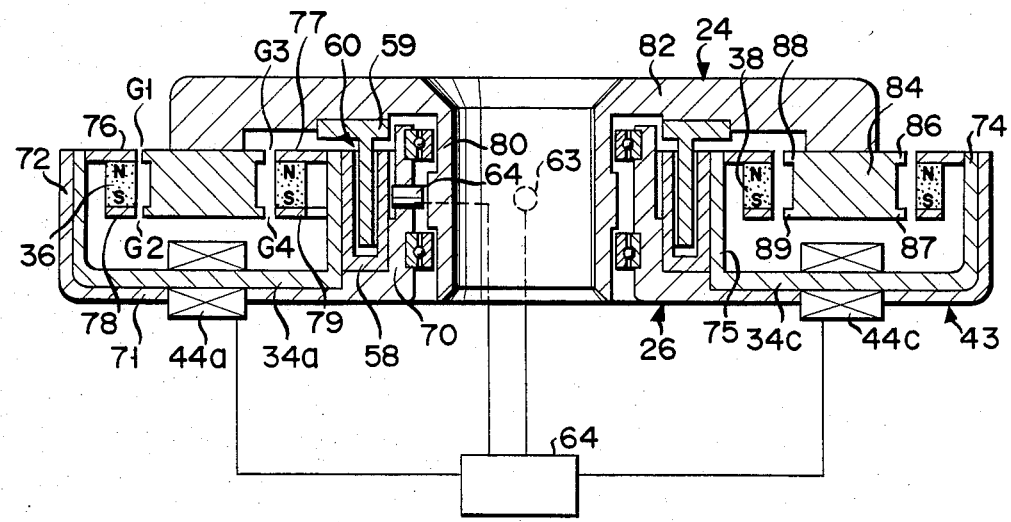

Moreover, while the above first embodiment of the invention was applied to the outer rotor type where the rotor is provided on the outer side of the stator, this is by no means limitative, and the invention is applicable to a so-called inner rotor type, as shown in FIG. 7.

In the embodiment of FIG. 7, the base 26, made of a non-magnetic material, has an inner cylindrical portion 70, a flange 71 radially extending outward from the lower end of the cylindrical portion 70, and an outer cylindrical portion 72 extending upward from the outer edge of the flange 71 and coaxial with the inner cylindrical portion 71. A stator side yoke 43 is secured to the base 26. The stator side yoke 43 has an outer cylindrical yoke 74 secured to the inner peripheral surface of the outer cylindrical portion 71, an inner cylindrical yoke 75 provided in the neighborhood of the inner cylindrical portion 70, a first annular yoke 76 secured to the top of the inner peripheral surface of the outer cylindrical yoke 74, and a second annular yoke 77 secured to the top of the outer periphery of the inner cylindrical yoke 75. The annular yokes 76 and 77 are coaxial with the inner cylindrical portion 70. A first annular magnet 36 is secured to the lower surface of the yoke 76, and a second annular magnet 38 is secured to the lower surface of the annular yoke 77. The magnets 36 and 38 are disposed coaxially with the base 26 and are magnetized in the same direction along the axial direction. Third and fourth annular yokes 78 and 79 are secured to the lower surface of the magnets 36 and 38, respectively, and constitute part of the stator side yoke 43.

The outer and inner cylindrical yokes 74 and 75 of the stator side yoke 43 are coupled together both magnetically and mechanically by four flat control poles 34a to 34d (only magnetic poles 34a and 34c are shown), made of a magnetic material. The control poles extend radially with respect to the axis of the base 26, and are uniformly spaced in the circumferential direction. Control coils 44a to 44d (only control coils 44a and 44d are shown) are wound around the respective control poles 34a to 34d.

The flywheel 24 is made of a non-magnetic material and has a cylindrical portion 80 provided on the inner side of the inner cylindrical portion 70 of the base 26 in contact-free and coaxial relation therewith, and a flange 82 radially extending outward from the upper end of the cylindrical portion 80. An annular yoke 84, as the rotor side yoke, is secured to the bottom of an outer edge portion of the flange 82. The yoke 84 is found between the first and second magnets 36 and 38, and coaxial with the cylindrical portion 80. The outer periphery of the yoke 84 has first and second annular projections 86 and 87 facing the yokes 76 and 78, respectively. The inner periphery of the yoke 84 has third and fourth annular projections 88 and 89 facing the yokes 77 and 79, respectively. Annular magnetic gaps G1 and G2 are formed between the projection 86 and 87 and yokes 76 and 78, and annular magnetic gaps G2 and G3 are formed between the projections 88 and 89 and yokes 77 and 79.

A stator 58 is secured to the upper surface of the flange 71 of the base 26, while a rotor 59 is secured to the flange 82 of the flywheel 24, the stator 58 and rotor 59 constituting a brushless motor 60. A pair of displacement sensors 62 and 63 are secured to the inner cylindrical portion 70 of the base 26 for detecting the radial distance between the base and flywheel. The displacement sensors and control coils are connected to a stabilization controller 64 and operate in the same manner as in the previous first embodiment. Mechanical bearings 66 and 67, which can support the flywheel 24 only in case of emergency, are secured to the inner periphery of the inner cylinder 70.

Figure 8:
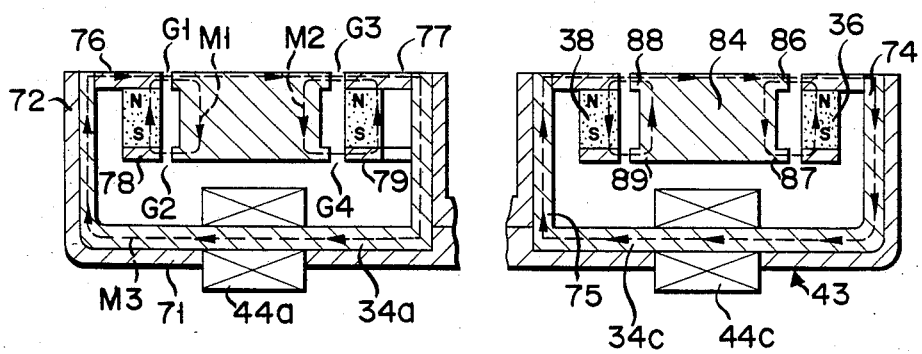

With the magnetic bearing of the above construction, the flux from the first magnet 36 flows through a first magnetic path M1 which passes through the magnet 36, yoke 76, magnetic gap G1, projection 86, yoke 84, projection 87, magnetic gap G2, yoke 78, and magnet 36, as shown in FIG. 8. The flux from the second magnet 38 flows through a second magnetic path M2 which passes through the magnet 38, yoke 77, magnetic gap G3, projection 88, yoke 84, projection 89, magnetic gap G4, yoke 79, and magnet 38. The magnetic forces of attraction produced by the fluxes passing through the first and second magnetic paths restrict the axial movement of the flywheel 24.

For example, the control flux generated with the excitation of the control coil 44a flows through a third magnetic path M3 which passes through the control pole 34a, outer cylindrical yoke 74, yoke 76, magnetic gap G1, yoke 84, magnetic gap G3, yoke 77, inner cylindrical yoke 75 and control pole 34a. This control flux controls the radial position of the flywheel in a manner like that of the first embodiment.

With the magnetic bearing of the above construction, the control fluxes produced by the control coils again pass through magnetic paths consisting of a closed loop extending radially with respect to the axis of rotation of the flywheel 24, as is seen in FIG. 8. Thus, like the first embodiment, not only a sufficient amount of control flux can be provided, but the length of the magnetic path of the control flux can also be reduced. Other effects similar to those obtainable with the first embodiment can also be obtained.

While the above embodiments of this invention are concerned with the flywheel assembly, this invention is of course applicable to apparatus other than the flywheel assembly.

What is claimed is:

1. A magnetic bearing device comprising:

a stator;

a rotor having a rotational axis and rotatable with respect to and in contact-free relation with the stator;

an annular magnet secured to the stator, coaxial with the rotational axis of the rotor, and magnetized in an axial direction;

magnetic path forming means including a stator side yoke secured to the stator and magnetically coupled to the annular magnet, at least three control poles magnetically coupled to the stator side yoke and radially extending with respect to the rotational axis of the rotor in a uniformly separated relationship to one another in a circumferential direction, and a rotor side yoke secured to the rotor to face the stator side yoke, said rotor side yoke having an outer cylindrical portion disposed coaxial with the rotational axis of the rotor on an outer side of the magnet facing the magnet, an inner cylindrical portion located on an inner side of the magnet, coaxial with the outer cylindrical portion, and an annular portion coupling the outer and inner cylindrical portions together and coaxial with the rotational axis of the rotor, for forming a first magnetic path for the passage of a magnetic flux from the magnet through the stator side yoke and rotor side yoke to control an axial position of the rotor, and for forming a control magnetic path passing through the stator side yoke, rotor side yoke and one of the control poles, overlapping part of the first magnetic path and extending substantially radially with respect to the rotational axis of the rotor;

control coils, wound around the control poles, for generating a control flux that flows through the control magnetic path, to control the flux flowing through the first magnetic path;

detecting means for detecting a radial position of the rotor relative to the stator; and control means for energizing the control coils, in accordance with the output of the detecting means, to thereby control the radial position of the rotor with respect to the stator.

2. The magnetic bearing device according to claim 1, wherein said stator side yoke includes a first annular yoke secured to one of the opposite pole surfaces of the magnet and to one end of each of the control poles, coaxial with the rotational axis of the rotor, a second annular yoke secured to the other end of each of the control poles and located at an inner side of and coaxially with the first yoke, and a third annular yoke secured to the other one of the pole surfaces of the magnet.

3. The magnetic bearing device according to claim 2, wherein said outer cylindrical portion has first and second annular projections formed on an inner periphery of said outer cylindrical portion, the first annular projection facing to and forming a first magnetic gap with the first yoke, and the second annular projection facing to and forming a second magnetic gap with the third yoke; said first magnetic path being a closed loop which passes through the magnet, third yoke, second magnetic gap, second projection, outer cylindrical portion, first projection, first magnetic gap, first yoke, and back to said magnet; and said control magnetic path being a closed loop which passes through one control pole, first yoke, first magnetic gap, first projection, outer cylindrical portion, annular portion, inner cylindrical portion, second yoke, and back to said one control pole.

4. The magnetic bearing device according to claim 3, which further comprises a second annular magnet having a first opposite pole surface secured to the second yoke to control the axial position of the rotor; the second magnet being coaxial with the first magnet and magnetized in the same direction as the first magnet along the axial direction.

5. The magnetic bearing device according to claim 4, wherein said stator side yoke includes a fourth annular yoke secured to a second opposite pole surface of the second magnet and coaxial with the rotational axis of the rotor; said inner cylindrical portion of the rotor side yoke has third and fourth annular projections formed on an outer periphery of said inner cylindrical portion, the third projection facing to and forming a third magnetic gap with the second yoke, and the fourth projection facing to and forming a fourth magnetic gap with the fourth yoke; and said magnetic path forming means forms a second magnetic path through which the flux from the second magnet flows through the second magnet, fourth yoke, fourth magnetic gap, fourth projection, inner cylindrical portion, third projection, third magnetic gap, second yoke, and back to said second magnet.

6. The magnetic bearing device according to claim 2, wherein said stator has a cylindrical portion, a flange radially extending outward from one end of the cylindrical portion, and an outer end portion extending from an outer periphery of the flange, coaxial with the cylindrical portion; said second annular yoke is secured to the outer end portion, coaxial with the cylindrical portion; and said rotor has an inner cylindrical portion located on an outer side of the cylindrical portion in a coaxial and contact-free relation therewith, an outer cylindrical portion coaxial with the inner cylindrical portion of the rotor and covering an outer periphery of the outer cylindrical portion of the rotor side yoke, and a flange coupling the outer and inner cylindrical portions of the rotor together and covering an outer surface of the annular portion of the rotor side yoke.

7. The magnetic bearing device according to claim 6, wherein said detecting means includes a pair of sensors secured to the cylindrical portion of the stator to face an outer periphery of the inner cylindrical portion of said rotor.

8. The magnetic bearing device according to claim 7, wherein said magnetic path forming means includes four control poles, each having a center line, uniformly spaced apart in the circumferential direction; said sensors being located on the center lines of two adjacent of the four control poles.

9. The magnetic bearing device according to claim 6, which further comprises a motor for rotating the rotor, the motor including an annular stator element secured to the flange of the stator coaxial with the cylindrical portion, and an annular rotor element secured to the flange of the rotor coaxial with the cylindrical portion and co-operating with the stator element.

10. The magnetic bearing device according to claim 6, which further comprises a mechanical bearing secured to an outer periphery of the cylindrical portion of the stator to support the rotor only in cases of emergency.

11. The magnetic bearing device according to claim 1, wherein said stator side yoke includes an outer cylindrical portion disposed on the outer side of, and coaxially with, the magnet, and coupled to one end of each of the control poles; an inner cylindrical portion disposed on an inner side of, and coaxially with, the outer cylindrical portion, and coupled to the other end of each control pole; a first annular yoke secured to an inner peripheral surface of the outer cylindrical portion and also to one of the opposite pole surfaces of the magnet, coaxial with the magnet; a second annular yoke secured to an outer peripheral surface of the inner cylindrical portion, coaxial with the first yoke; and a third annular yoke secured to the other one of the opposite pole surfaces of the magnet, coaxial with the magnet; and said rotor side yoke includes an annular yoke disposed between and facing the first and second yokes, coaxial with the magnet.

12. The magnetic bearing device according to claim 1, wherein said rotor side annular yoke has first and second annular projections formed on an outer periphery of said rotor side annular yoke, the first projection facing to and forming a first magnetic gap with the first yoke, the second projection facing to and forming a second magnetic gap with the third yoke; said first magnetic path is a closed loop which passes through the magnet, first yoke, first magnetic gap, first projection, rotor side annular yoke, second projection, second magnetic gap, third yoke, and back to said magnet; and said control magnetic path is a closed loop which passes through the one control pole, outer cylindrical portion, first yoke, first magnetic gap, rotor side annular yoke, second yoke, inner cylindrical portion, and back to said control pole.

13. The magnetic bearing device according to claim 12, which further comprises a second annular magnet having a first opposite pole surface secured to the second yoke to control the axial position of the rotor; the second magnet being coaxial with the first magnet and magnetized in the same direction as the first magnet along the axial direction.

14. The magnetic bearing device according to claim 13, wherein said stator side yoke has a fourth annular yoke secured to a second opposite pole surface of the second magnet and coaxial with the rotational axis of the rotor; said rotor side annular yoke has third and fourth annular projections formed on an inner periphery of said rotor side annular yoke, the third projection facing to and forming a third magnetic gap with the second yoke, the fourth projection facing to and forming a fourth magnetic gap with the fourth yoke; and said magnetic path forming means forms a second magnetic path through which the flux from the second magnet flows through the second magnet, second yoke, third magnetic gap, third projection, rotor side annular yoke, fourth projection, fourth magnetic gap, fourth yoke, and back to said second magnet.

* * * * *

UNITED STATES PATENT AND TRADEMARK OFFICE
CERTIFICATE OF CORRECTION

PATENT NO. : 4,652,780
DATED : March 24, 1987
INVENTOR(S) : MURAKAMI, Chikara ET AL It is certified that error appears in the above-identified patent and that said Letters Patent is hereby corrected as shown below:

Title page, item [73] Assignee:
SHOULD READ:

DIRECTOR GENERAL OF NATIONAL AEROSPACE LABORATORY
AND
KABUSHIKI KAISHA TOSHIBA

Signed and Sealed this

First Day of June, 1993

Attest:

MICHAEL K. KIRK

Attesting Officer        Acting Commissioner of Patents and Trademarks